United States Patent [19]

Curry

[11] Patent Number: 4,622,473
[45] Date of Patent: Nov. 11, 1986

[54] WAVE-ACTION POWER GENERATOR PLATFORM

[76] Inventor: Adolph Curry, 1306 Saw Mill Creek Rd., Sitka, Ak. 99835

[21] Appl. No.: 631,485

[22] Filed: Jul. 16, 1984

[51] Int. Cl.$^4$ .............................................. F03B 13/12
[52] U.S. Cl. ........................................ 290/53; 290/42;
290/43; 290/54; 290/1 R; 60/497; 60/501;
60/495
[58] Field of Search .................... 290/42, 43, 44, 53,
290/54, 55, 1; 60/495-507; 417/330-333

[56] References Cited

U.S. PATENT DOCUMENTS

| | | | |
|---|---|---|---|
| 1,623,341 | 4/1927 | Hare | 417/333 |
| 1,930,958 | 10/1933 | Parsons | 417/332 |
| 2,477,691 | 8/1949 | Griffin | 417/332 |
| 2,871,790 | 2/1959 | Weills | 417/333 |
| 3,697,764 | 10/1972 | Stanziola et al. | 290/53 X |
| 3,957,398 | 5/1976 | Lloyd | 60/503 X |
| 4,083,186 | 4/1978 | Jackson, Sr. | 60/495 X |
| 4,173,432 | 11/1979 | Vines | 417/333 X |
| 4,196,591 | 4/1980 | Wallace | 417/332 X |

FOREIGN PATENT DOCUMENTS 248678  5/1910  Fed. Rep. of Germany ........ 60/501

Primary Examiner—William M. Shoop, Jr.
Assistant Examiner—Shik Luen Paul Ip
Attorney, Agent, or Firm—Neal J. Mosely

[57] ABSTRACT

An off-shore platform is provided with a power grid comprised of a plurality of depending float members which are buoyant and weighted sufficiently to rise vertically in response to the buoyant energy of the wave action and to fall in response to gravity. A reciprocating piston member disposed in a cylinder is operatively connected to each float member to compress a fluid on the up stroke as the float member rises on a wave, and to extract fluid from a reservoir on the down stroke as the float member falls after the wave passes. The exhaust ports of the cylinders are commonly connected to accumulate fluid pressure in an exhaust reservoir sufficient to drive a turbine which powers an electric generator. The intake ports of the cylinders are commonly connected to an intake reservoir whereby the fluid extracted therefrom drives a second turbine and electric generator. The generating equipment disposed atop the platform sends the electricity to shore through subsea power lines.

12 Claims, 3 Drawing Figures

WAVE-ACTION POWER GENERATOR PLATFORM

BACKGROUND OF THE INVENTION

1. Field of the Invention

This invention relates to electrical power generating apparatus for generating electrical power utilizing wave action and gravity.

2. Brief Description of the Prior Art

Apparatus utilizing the natural stored energy of wave and/or tidal motion to generate electrical power is known in the art. These are several patents which disclose various power generating apparatus and methods.

Rainey, U.S. Pat. No. 4,208,878 discloses an ocean tide energy converter comprising a large buoyant tidal piston provided with a chamber and one or more valves that can be rapidly opened or closed by preprogrammed actuators to either allow water to flood the chamber, or to discharge water already contained therein. The tidal piston is connected to a large hydraulic ram whereby the rise and fall of the tidal piston due to the change in tide compresses hydraulic fluid inside the ram and is discharged to an accumulator and then to a hydraulic motor to drive an electrical generator.

At low tide, the tidal piston chamber is filled with air and the ram piston is locked against vertical movement. After the tide has risen, the ram piston is released and the buoyancy of the tidal piston compresses the fluid in the ram. At a predetermined level, the actuators open the valves of the chamber to discharge the air and allow water to enter the chamber and the ram piston is again locked. At low tide, the ram piston is released and the weight of the water filled tidal piston pulls the ram piston down to compress the fluid in the lower chamber of the ram.

West, U.S. Pat. No. 4,218,192 discloses a pressure source which develops a stream of liquid under pressure as a consequence of the rise and fall of the water surface. The apparatus comprises a cylinder mounted on the floor of a body of water having a reciprocating piston disposed therein which compresses liquid in the chamber below the piston. A central shaft member extends upwardly from the piston to a buoyant weight member which floats on the water surface. A conduit through the shaft member contains a check valve to establish one-way communication between the pressurized liquid and an electrical generator. An inlet port and check valve allows liquid to enter the chamber below the piston directly from the body of water or from a separate recirculating system. A release valve in the conduit prevents lowering of the buoyant weight member unless the water surface is below a reference level.

Tornabene, U.S. Pat. No. 4,073,142 discloses a wave action apparatus comprising a series of offset rows of spaced apart reciprocal floats mountably positioned at predetermined distances relative to one another such that radially-outwardly traveling turbulances resulting from upwardly and downwardly reciprocation of the floats coincide with one another and with current and/or wave water forces to result in amplified strokes of reciprocation of the floats, and the process of subjecting the floats to such forces, and pooling the energy of a plurality of such floats into a common driving force.

Lapeyre, U.S. Pat. Nos. 3,818,704 and 4,384,212, and Snook, U.S. Pat. No. 1,025,929 disclose apparatus comprising rotating helical members to convert wave action into useful energy.

McLaughlin, U.S. Pat. No. 868,798, Coon, U.S. Pat. No. 891,671, and Kunkel, U.S. Pat. No. 1,381,712 disclose apparatus comprising rotating propeller members to convert water current to useful energy.

The prior art in general, and none of these patents in particular, disclose the present invention for generating electrical power from wave action which comprises a platform having a deck portion suspended above the water surface on upwardly extending upright members and a power grid assembly disposed on the bottom surface of said deck provided with means for generating electrical power by pressurizing a fluid as a consequence of the rise and fall of a wave passing therebelow.

SUMMARY OF THE INVENTION

It is therefore an object of the present invention to provide an apparatus and method for harnessing the natural buoyant energy of wave action in a body of water and converting it to electrical energy.

It is another object of the invention to provide an off-shore platform which will provide electrical current to a remote location.

It is another object of the present invention to provide an off-shore platform having a power grid comprised of a plurality of depending buoyant members which are also weighted to rise vertically in response to the buoyant energy of wave action and to fall in response to gravity.

It is another object of the invention to provide an off-shore platform wherein a fluid is compressed and pressure accumulated from a plurality of independently operable and commonly connected cylinders in a reservoir sufficient to drive a turbine which powers an electric generator as a consequence of the rise and fall of waves passing beneath the platform.

It is another object of the invention to provide an off-shore platform wherein a fluid is extracted from a reservoir sufficient to drive a turbine and electric generator as a consequence of the force of gravity on a plurality of independently operable and commonly connected cylinder members.

Other objects of the invention will become apparent from time to time throughout the specification and claims as hereinafter related.

The above noted objects and other objects of the invention are accomplished by an off-shore platform provided with a power grid comprising a plurality of depending float members which are buoyant and weighted sufficiently to rise vertically in response to the buoyant energy of the wave action and to fall in response to gravity. A reciprocating piston member disposed in a cylinder is operatively connected to each float member to compress a fluid on the up stroke as the float member rises on a wave, and to extract fluid from a reservoir on the down stroke as the float member falls after the wave passes. The exhaust ports of the cylinders are commonly connected to accumulate fluid pressure in an exhaust reservoir sufficient to drive a turbine which powers an electric generator. The intake ports of the cylinders are commonly connected to an intake reservoir whereby the fluid extracted therefrom drives a second turbine and electric generator. The generating equipment disposed atop the platform sends the electricity to shore through subsea power lines.

DESCRIPTION OF THE PREFERRED EMBODIMENT

Figure 2:
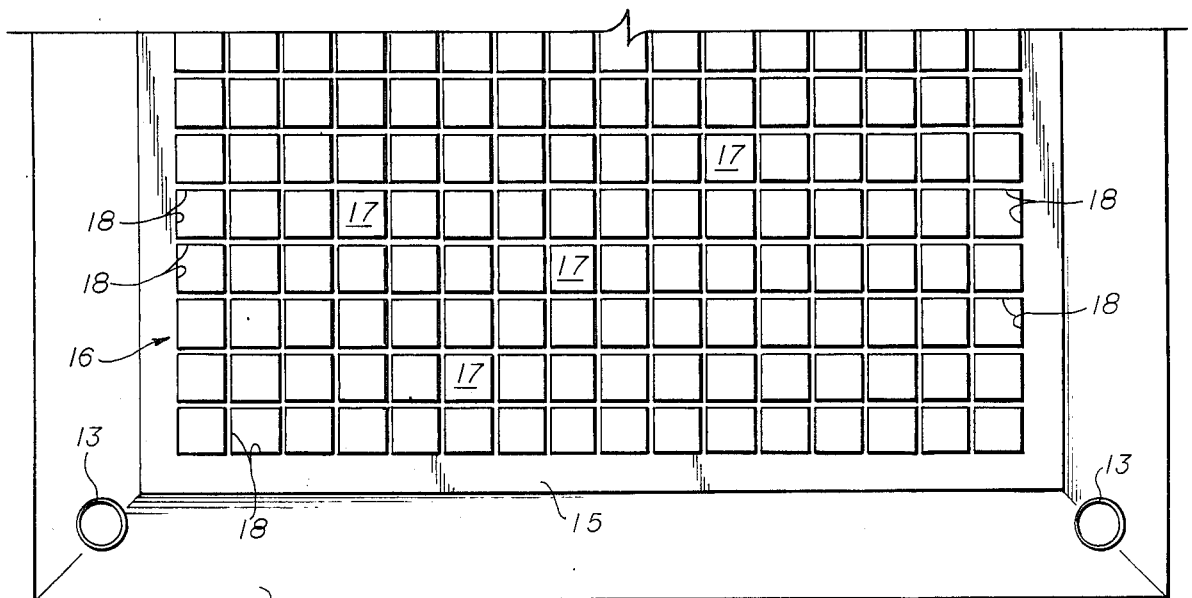
FIG. 2 is a partial bottom plan view of the wave-action power generator platform taken along line 2—2 of FIG. 1.
Figure 1:
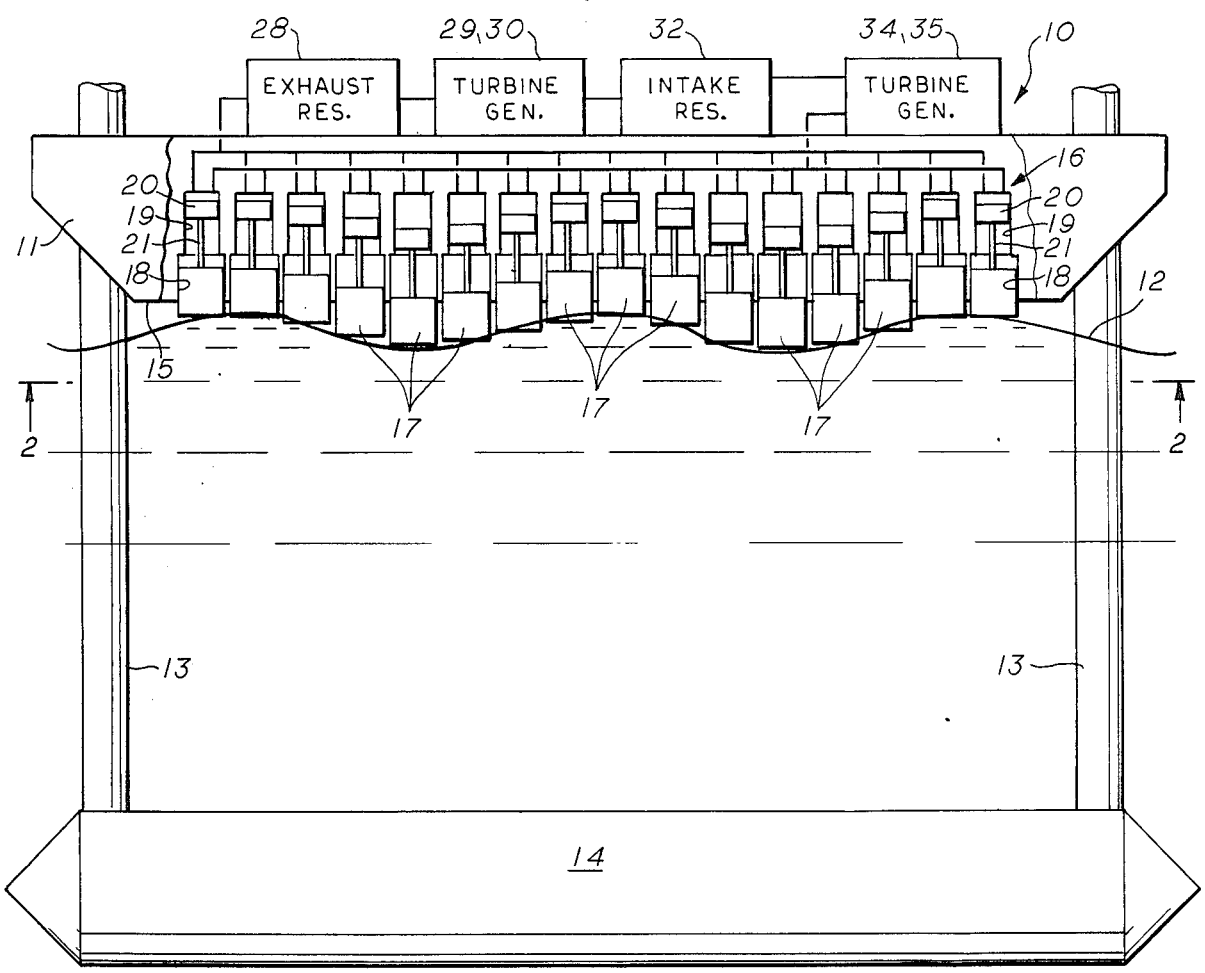
FIG. 1 is a view in side elevation of a wave-action power generator platform, a portion of which is shown schematically.

Referring now to the drawings by numerals of reference, there is shown a wave-action power generator platform 10. The platform 10 comprises a deck 11 suspended above the water surface 12 on pipe uprights 13 which extend upwardly from cylindrical hulls 14 submerged below the wave action at the water surface. Conventional ballast systems allow the hulls to be placed at the correct depth. It should be understood that for shallow water installations, the pipe uprights 13 may be secured to the floor of the body of water in which case the hulls 14 may be considered the piling in which the platform is anchored.

The deck 11 of the platform 10 may be adjusted to move up or down on the uprights 13 relative to the wave heights and tidal changes by conventional platform jack-up systems. The bottom 15 of the deck 11 should preferably contact the approximate crest of the wave.

The bottom 15 of the deck 11 is provided with a power grid assembly 16 comprised of a plurality of depending float members 17 slidably mounted in chambers 18 arranged in a series of adjacent rows and columns. The float members 17 are formed from heavy material in a manner to provide weight and buoyancy whereby they will rise vertically in response to the buoyant energy of the wave action and to fall in response to gravity.

The float members 17 are shown as being of square cross section to maximize the available area of the deck bottom 15 provided with floats. Other cross sections which will nest with virtually no lost space between the individual floats, e.g. rectangular, triangular, or hexagonal, can be used for the floats. Also, the floats may be cylindrically shaped but with some loss in efficiency resulting from unused area on the bottom of the deck. The height of the float members 17 is sufficient to allow them to depend from the deck bottom 15 to float on the trough of a wave and their upper portion still retained within the lower portion of the chamber 18.

Figure 3:
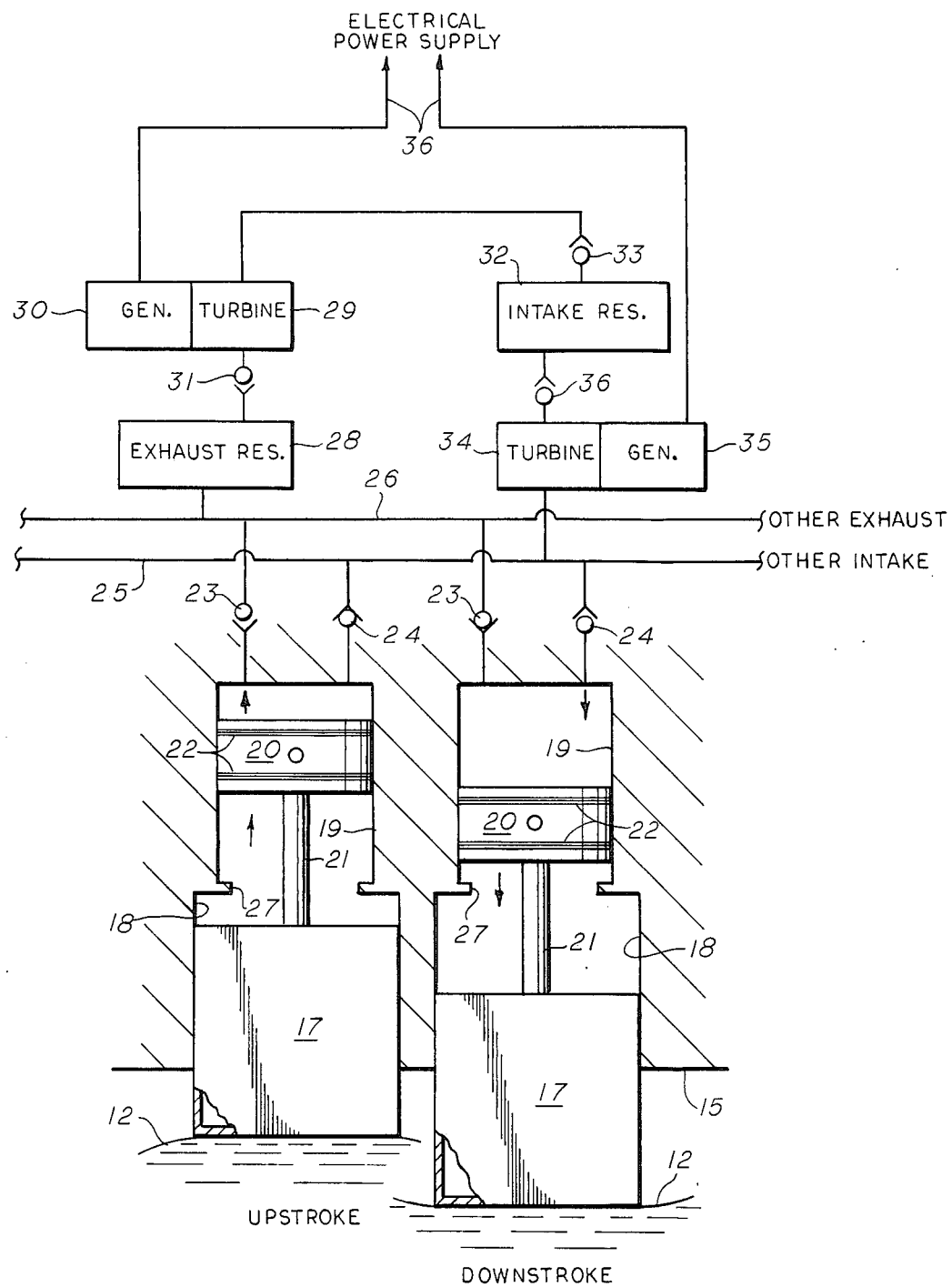
FIG. 3 is a schematic illustration of the operation of the components of the system in the upstroke and downstroke positions.

A plurality of cylinders 19 are disposed above each float member guide chamber 18, each having a piston 20 connected to the float members 17 through piston rods 21. The pistons 20 move within the cylinders 19 and are provided with suitable reciprocating seals 22 (FIG. 3). A pair of one-way valves such as reed valves or check valves are provided at the top portion of the cylinders 19. One of the valves is an exhaust valve 23 and the other is an inlet valve 24. All of the exhaust valves 23 are commonly connected by an exhaust manifold represented by line 25, and all of the inlet valves 24 are commonly connected by an inlet manifold represented by line 26. Shoulders 27 disposed at the bottom of the cylinders 19 retain the pistons 20 within the cylinders and the float members 17 within the chambers 18. The "cylinders" 19 and pistons 20 may be of non-circular cross-section, e.g. polygonal, etc., if desired, although a true cylindrical shape is preferred.

The exhaust manifold 25 is connected to an exhaust reservoir or accumulator 28 which is connected to a turbine 29 or motor which drives an electric generator 30. A one-way valve 31 is disposed between the reservoir 28 and the turbine 29 to allow fluid to pass only into the turbine 29. The exhaust port of the turbine 29 is connected to an intake reservoir or accumulator 32 and a one-way valve 33 disposed therebetween to allow fluid to pass only into the reservoir 32. The outlet port of the intake reservoir 32 is connected to a second turbine 34 which drives a second electric generator 35. A one-way valve 36 is disposed between the intake reservoir 32 and the turbine 34 to allow fluid to pass only into the turbine 34. The outlet port of the turbine 34 is connected to the inlet manifold 26.

OPERATION

The system may be operated using air or hydraulic fluid. The hydraulic cylinders 19 are normally full of suitable fluid on the top side of the pistons 20. As shown in FIG. 3, as a wave passes beneath the deck 11, and one of the float members 17 is pushed upward by the buoyant force of the wave, the piston 20 attached thereto is moved upwardly to compress the fluid in the cylinder 19. Upon reaching a predetermined pressure level, the valve 23 opens and the pressurized fluid is exhausted into the exhaust reservoir 28. The exhaust reservoir 28 receives fluid from a plurality of the hydraulic ram cylinders 19 which may be operating on the upstroke.

When the accumulated pressure reaches a predetermined level, the valve 31 opens to allow the pressurized fluid to drive the turbine 29 which in turn powers the electric generator 30. The fluid exhausted from the turbine 29 opens the valve 33 to enter the intake reservoir 32.

As the wave passes, the cube 17 falls to the trough of the wave due to its weight and the force of gravity. When the cube 17 falls, the piston 20 is pulled down creating a vacuum in the cylinder 19 which closes valve 23 and opens valve 24. The vacuum thus created from a plurality of falling float members 17 extracts fluid from the intake reservoir 32 through the second turbine 34 which powers the second electric generator 36. The electric generators 30 and 35 sends the electricity thus produced to shore through subsea power lines 36.

This apparatus is therefore operable to utilize both the upward and downward movement of the water (rather than a horizontal movement) from each wave passing therethrough. The apparatus may be used to supply energy to shore installations or may be used to supply energy for isolated offshore uses. In shallow water, the platform may be in a fixed position. In deep water, the platform may be of the semi-submersible type supported on floats positioned deep enough in the water to be below wave action and anchored in place. The apparatus is preferably adjustable in height above the water surface so that it can be elevated above contact with the waves in rough weather to eliminate damage.

While this invention has been described fully and completely with special emphasis upon a preferred embodiment, it should be understood that within the scope of the appended claims the invention may be practiced otherwise than is specifically described herein.

I claim:

1. An apparatus adapted to be positioned in a body of water for generating electrical power from wave action therein, comprising
   a platform having a deck and leg members extending in supporting relation thereto and adapted to suspend said deck above the water surface when installed in a body of water,
   means to adjust the position of said deck above the wave-free surface of the water when said platform is installed in place, and
   a power grid assembly disposed on the bottom surface of said deck including means for generating electrical power by pressurizing a fluid in response to the rise and fall of a wave passing therebelow,
   said power grid comprising a plurality of weighted float members supported on and guided for vertical movement relative to said deck to contact the water surface at the wave-free level and provide independent reciprocal vertical movement in response to the rise and fall of the water surface by wave action,
   said means for generating electrical power operated by both upward and downward vertical movement of said float members and comprising a plurality of piston members each positioned within a plurality of cylinders and each connected one to each of said float members at one end for direct operation thereby, a fluid contained in said cylinders acted upon by said pistons, and turbogenerator means operated by said fluid.

2. An apparatus according to claim 1 in which said power grid assembly comprises;
   a plurality of weighted floating members slidably contained within and depending from the bottom surface of said deck to contact the water surface and provide independent reciprocal vertical movement in response to the rise and fall of the water surface by wave action,
   a plurality of fluid chambers, each having a piston member connected to one of said floating members to pressurize a fluid contained therein on upward movement of said floating member and to induct fluid thereinto on downward movement of said floating member,
   first and second valve means connected to each of said fluid chambers, the first allowing fluid to be exhausted therefrom upon reaching a predetermined pressure and the second allowing fluid to be inducted thereinto upon reaching a predetermined reduced pressure,
   a first exhaust fluid reservoir for accumulating exhausted fluid under pressure from said fluid chambers,
   exhaust manifold means connecting each of said first valve means to said exhaust fluid reservoir,
   a first drive means connected for actuation by pressurized fluid accumulated in said exhaust reservoir,
   an electrical generator connected for operation by said first drive means,
   a third valve interposed between said exhaust reservoir and said first drive means permitting the pressurized fluid accumulated in said exhaust reservoir to escape therefrom upon reaching a predetermined pressure,
   a second intake fluid reservoir for accumulating fluid exhausted from said first drive means,
   a fourth valve means interposed between said first drive means and said intake fluid reservoir for one way communication therebetween,
   a second drive means connected for actuation by fluid accumulated in said intake fluid reservoir,
   a second electrical generator connected for operation by said second drive means,
   a fifth valve means interposed between said intake reservoir and said second drive means for one way communication therebetween, and
   inlet manifold means for connecting the exhaust of said second drive means to each of said second valve means.

3. An apparatus according to claim 1 including submersible hull members secured on the bottom ends of said legs and having a ballast system for depth adjustment below said water surface.

4. An apparatus according to claim 1 in which said legs are secured at their lower end to the floor of said body of water and have means for adjusting the position of said deck vertically therealong relative to said legs.

5. An apparatus according to claim 1 in which said means operated by vertical movement of said float members comprises a plurality of cylinders with said piston members positioned therein, a fluid reservoir,
   a manifold connected to said cylinders and to said reservoir,
   a fluid contained in said cylinders, said reservoir, and said manifold and acted upon by said pistons, and turbogenerator means operated by said fluid.

6. An apparatus according to claim 1 in which said floating members comprise a plurality of depending cube shaped members slidably mounted in chambers of square cross-section and arranged in a series of adjacent rows and columns.

7. An apparatus according to claim 1 in which said float member operated means comprises a plurality of hydraulic ram cylinders disposed above each of said float members and provided with reciprocating pistons connected one to each of said float members by piston rods.

8. An apparatus according to claim 1 in which said float member operated means includes a turbine.

9. An apparatus for generating electrical power from wave action in a body of water, comprising
   a platform installed in a body of water, subject to wave action, having a deck and leg members extending in supporting relation thereto and suspending said deck above the wave-free surface of the water,
   means to adjust the position of said deck above the wave-free surface of the water when said platform is installed in place, and
   a power grid assembly disposed on the bottom surface of said deck including means for generating electrical power by pressurizing a fluid in response to the rise and fall of a wave passing therebelow,
   said power grid comprising a plurality of weighted float members supported on and guided for vertical movement relative to said deck to contact the water surface at the wave-free level and provide independent reciprocal vertical movement in response to the rise and fall of the water surface by wave action,
   said means for generating electrical power operated by both upward and downward vertical movement of said float members and comprising a plurality of piston members each positioned within a plurality of cylinders and each connected one to each of said float members at one end for direct operation thereby, a fluid contained in said cylinders acted upon by said pistons, and turbogenerator means operated by said fluid.

10. An apparatus according to claim 9 including submersible hull members secured on the bottom ends of said legs and having a ballast system for depth adjustment below said water surface.

11. An apparatus according to claim 9 in which said legs are secured at their lower end to the floor of said body of water and have means for adjusting the position of said deck vertically therealong relative to said legs.

12. An apparatus according to claim 9 in which said means operated by vertical movement of said float members comprises a plurality of cylinders with said piston members positioned therein, a fluid reservoir, a manifold connected to said cylinders and to said reservoir, a fluid contained in said cylinders, said reservoir, and said manifold and acted upon by said pistons, and turbogenerator means operated by said fluid.

* * * * *